United States Patent [19]

Ahouse et al.

[11] 4,278,950
[45] Jul. 14, 1981

[54] ELECTRO-DYNAMIC LASER WITH ACOUSTIC ABSORBING ELECTRODE

[75] Inventors: David R. Ahouse, Andover; Jack D. Daugherty, Winchester; Sheldon L. Glickler, Framingham; Paul F. Kellen, Medford; George W. Sutton; David Korff, both of Lexington; Marvel J. Yoder, Andover, all of Mass.

[73] Assignee: The United States of America as represented by the Secretary of the Air Force, Washington, D.C.

[21] Appl. No.: 46,073

[22] Filed: Jun. 6, 1979

[51] Int. Cl.³ .......................... H01S 3/08; H01S 3/22
[52] U.S. Cl. ........................ 331/94.5 G; 331/94.5 C
[58] Field of Search .................. 331/94.5 PE, 94.5 T, 331/94.5 G

[56] References Cited

U.S. PATENT DOCUMENTS

| 3,702,973 | 11/1972 | Daugherty et al. | 331/94.5 PE |
| 3,848,202 | 11/1974 | Hyne | 331/94.5 PE |
| 3,952,264 | 4/1976 | Ingard | 331/94.5 G |
| 4,196,399 | 4/1980 | Cason et al. | 331/94.5 G |

OTHER PUBLICATIONS

"Output Flux Instabilities in a Flowing-Gas cw $CO_2$ Electric Discharge Laser", Yoder et al., *App. Phys. Lett.*, vol. 27, No. 12, pp. 673-676, Dec. 15, 1975.
"Beam Properties of a $CO_2$ Continuous-Wave Electric Discharge Laser;" Optical Engineering, vol. 18, No. 3, pp. 340-344, (May-Jun. 1979); Kellen et al.

*Primary Examiner*—William L. Sikes
*Assistant Examiner*—León Scott, Jr.
*Attorney, Agent, or Firm*—Donald J. Singer; Jacob N. Erlich

[57] ABSTRACT

A high pressure, high power, continuous wave electro-dynamic laser having one of the electrodes (preferably the cathode) made of a porous conductive surface and a backing material capable of broad band acoustic absorption. Such an arrangement effectively absorbs acoustic disturbances which arises primarily from a linear instability within the resonant cavity of the electro-dynamic laser and thereby substantially reduces output flux modulations within the resonant cavity.

10 Claims, 2 Drawing Figures

ELECTRO-DYNAMIC LASER WITH ACOUSTIC ABSORBING ELECTRODE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to high pressure, high power, continuous wave (CW) electro-dynamic lasers, and, more particularly, to a CW electro-dynamic laser having an acoustic absorbing electrode incorporated therein.

Since the development of the first working lasers, considerable time and effort has been expended in the search for high power output laser systems. The possible applications of high power lasers are unlimited in the fields of communication, manufacturing, construction, medicine, space exploration, and defense.

The gas laser has grown out of the initial laser effort and is representative of one of the more sophisticated laser techniques which has the capability of providing very high power radiation output, the primarily to the large gas handling capability characteristic of such a system and due to the large quantity of energy which can be added to the gases flowing in such systems.

While the preferred embodiment of the present invention will be described in connection with an e-beam ionized, electrically excited nitrogen ($N_2$), carbon dioxide ($CO_2$) and helium (He) laser, it may be applied to other systems where a flowing laser gas is required or useful and including, but not restrictive to, gas constituents other than $N_2$, $CO_2$ and He as well as other lasing systems. For an electron beam ionized laser, the discharge produced does not require ionization by the discharge electrons, in a lasing environment, hence the electrical discharge can be adjusted to the correct electron temperature for most efficient laser operation. Moreover, the laser is volumetric in the sense that the proper gas temperature and lower laser state concentrations are maintained by volumetric flow, instead of diffusion through the gas to cooled side walls. Further, the laser may be operated in the static pulse as well as the flowing gas mode.

Two conditions must be fulfilled in order to bring about laser action: (1) population inversion must be achieved and (2) a process of photon amplification must be established in a suitable cavity or resonator such as, for example, an optical cavity, optical resonator or resonant cavity. Population inversion can, for example, be accomplished if (1) the atomic system has a least three levels (one ground and at least two excited levels) which can be involved in the excitation and emission processes and (2) the lifetime of one of the most energetic of the excited states is much longer than that of the other or others.

When a system is in a condition where light (photon) amplification is possible, laser action can be achieved by providing (1) means for stimulating photon emission from the long-lived state, and (2) means for causing photon amplification to build up to extremely high values. In the usual embodiment, this is accomplished by fashioning the medium containing the active atoms into a chamber with highly (as far as possible) reflecting ends polished so highly that the surface roughness is measured in terms of the wave length of the laser. The ends may be simply polished metal or they may be silvered or dielectric coated so that they behave as mirrors which reflect photons coming toward them from the interior of the chamber. Such a structure, whether the mirrors are within or outside the chamber, is called the optical or resonant cavity. If now pumping means, such as for example, an electric discharge acts on the medium and brings about population inversion of the long-lived state with respect to another lower energy excited state even though the long-lived state is only relatively long-lived, in a small fraction of a second there will be spontaneous emission of photons. Most of these photons will be lost to the medium but some of them will travel perpendicular to the ends and be reflected back and forth many times by the mirrors. As these photons traverse the active medium, they stimulate emission of photons from all atoms in the long-lived state which they encounter. In this way the degree of light amplification in the medium increases extraordinarily and because the photons produced by stimulated emission have the same direction and phase as those which stimulate them, and assuming the optical quality of the laser media is suitable, the electromagnetic radiation field inside the chamber or cavity is coherent. In order to extract a useful beam of this coherent light from the cavity, one (or both of the mirrors is made partially transmissive. A portion of the highly intense beam leaks by the mirror, and emerges with regularly spaced wave fronts. This is the laser beam.

In the electro-dynamic laser an electron beam is fired into a gas filled optical or resonant cavity so as to ionize a fraction of the gas to provide free electrons. The use of an electron beam for electric laser pumping is fully described in U.S. Pat. No. 3,702,973 issued Nov. 14, 1972. These electrons are subject to the sustainer voltage which adds energy to them, heating them to a desired temperature. In the case of the $CO_2$ laser, the electrons transfer some of their energy to $N_2$ and $CO_2$ in the cavity by collision processes, pumping (quantum mechanically) these gases to an upper laser energy level. The $N_2$ transfers its vibrationally excited energy to the $CO_2$. The $CO_2$ relaxes to a lower level by the emission of radiation. The cavity is bounded with mirrors which reflect some of the stimulated emission back into the cavity stimulating more emission, etc. The radiation is eventually led out of the cavity in the form of a laser beam. Because not all of the energy introduced is discharged by the gas in the form of laser radiation output energy, both the processor of heating the electrons and lasing heat the gas as well. This heating of the gas has two (or more) deleterious effects, (1) it can fill up the lower lasing level which causes lasing to stop, and (2) it can cause the temperature of the gas to rise to the point where the components themselves are damaged. In order to prevent such an undesirable occurrence the laser gas is caused to flow through the cavity in a wind tunnel-type arrangement so as to replace the hot gas with fresh cool gas.

The electro-dynamic laser cavities have optical resonator modes and acoustic resonator modes. These modes or the electromagnetic and acoustic waves, can and do interact on each other through the laser medium with the growth of one causing a corresponding growth of the other which in turn causes more growth of the first, etc. This is referred to as a mode-medium interaction instability. Somewhat oversimplifying, the electromagnetic energy losses in the resonant optical cavity are sensitive to small perturbations of the gas density profile of the gas in the resonant cavity (the density profile initially exists because of the standing acoustic waves) which are the Fourier decomposition at acoustic noise and the density profile in turn is affected by variations in the gas flux. This is a positive feedback process in which under proper circumstances a perturbation of the flux causes a change in the density profile of the gas which in turn increases the magnitude of the perturbation of the flux which then magnifies the change in the density profile until the growth of one or both of these effects causes lasing action to cease.

As a consequence thereof, the power output of high pressure, high power, continuous wave (CW) electrodynamic lasers modulates severely. This modulation varies, depending on particular operating conditions of the laser, from $\pm 10\%$ about a mean CW component, to full off and on, 100%. Further, this modulation could under certain circumstances substantially reduce electrical efficiencies and degrade output beam quality to unacceptable levels. Since maintaining good optical quality or homogeneity of the laser medium is of prime importance in the development of high-power high-performance lasers, alleviating the problems set forth above are considered essential in furthering the development of CW electro-dynamic laser technology.

SUMMARY OF THE INVENTION

The present invention overcomes the problems encountered in the past by providing a continuous wave electro-dynamic laser which successfully controls the output laser photon flux modulation in high-power, high pressure operation.

Since the problems set forth hereinabove are generally unique to (although not limited to) continuous high pressure, high power electro-dynamic lasers a brief description of such a laser is set forth below. The high pressure, high power CW electro-dynamic laser is provided with uniform gas flow through the resonant cavity by passing through a converging nozzle. A high energy electron beam (as described in U.S. Pat. No. 3,702,973) ionizes the gas flow allowing electrical energy to be pumped into the gas through sustainer electrodes. These electrodes are generally in the form of solid surfaces for both the anode and cathode. For optimum use of lasing fluid the anode in the CW electro-dynamic laser may also serve as the foil to isolate the electron beam vacuum chamber from the high pressure discharge.

In order to eliminate the modulations produced in the output of high pressure, high power, continuous wave electro-dynamic laser it is first necessary to understand the complex physical processes which cause the modulation. A key to such an understanding is based on the extreme sensitivity of the optical unstable resonator losses to laser medium density disturbances and the closed loop amplification of these disturbances by the output flux. In particular, standing wave acoustic disturbances between the electrodes of the laser may grow to the point where they can vary resonator losses such that the laser output is modulated 100%. In order to break this closed loop amplification of standing wave disturbances the instant invention provides modification of the continuous wave electro-dynamic laser such that the acoustic absorption characteristics of the resonant cavity are greatly improved.

This is accomplished by altering the acoustic characteristics of the electrode structure by making the surface of one of the electrodes (preferably the cathode) porous and by backing it with an absorbing material. Such an acousticly porous electrode can be one in which there is an 80 mesh per inch screen or it can be formed of a sintered fiber metal plate made out of stainless steel having an acoustic impedance of 30 to 50 Rayls. The requisite properties of such an electrode as defined in this invention are that it be electrically conductive with sufficient surface area to operate in the normal cathode fall regime and also be acoustically transmitting. The bulk of the acoustic aborption is accomplished by the backing material.

This backing material should be a broad band absorber with its absorption peak centered around the fundamental anode to cathode acoustic frequency; it must be segmented to prevent recirculation within the absorber of the main stream resonator cavity flow, and the depth of each absorption cell should be approximately 2 to 3 times the anode to cathode spacing. Utilization of the arrangement of this invention in a high power, high pressure continuous wave electro-dynamic laser greatly controls and substantially reduces the output flux modulation.

It is therefore an object of this invention to provide a high pressure, high power, continuous wave electro-dynamic laser which is effective in controlling and substantially reducing output flux modulation.

It is another object of this invention to provide a high pressure, high power, continuous wave electro-dynamic laser which has improved electrical efficiency.

It is still a further object of this invention to provide a high pressure, high power continuous wave electro-dynamic laser which has improved output beam quality.

It is still a further object of this invention to provide a high power continuous wave electro-dynamic laser which, through the use of high pressure, is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWINGS

Figure 1:
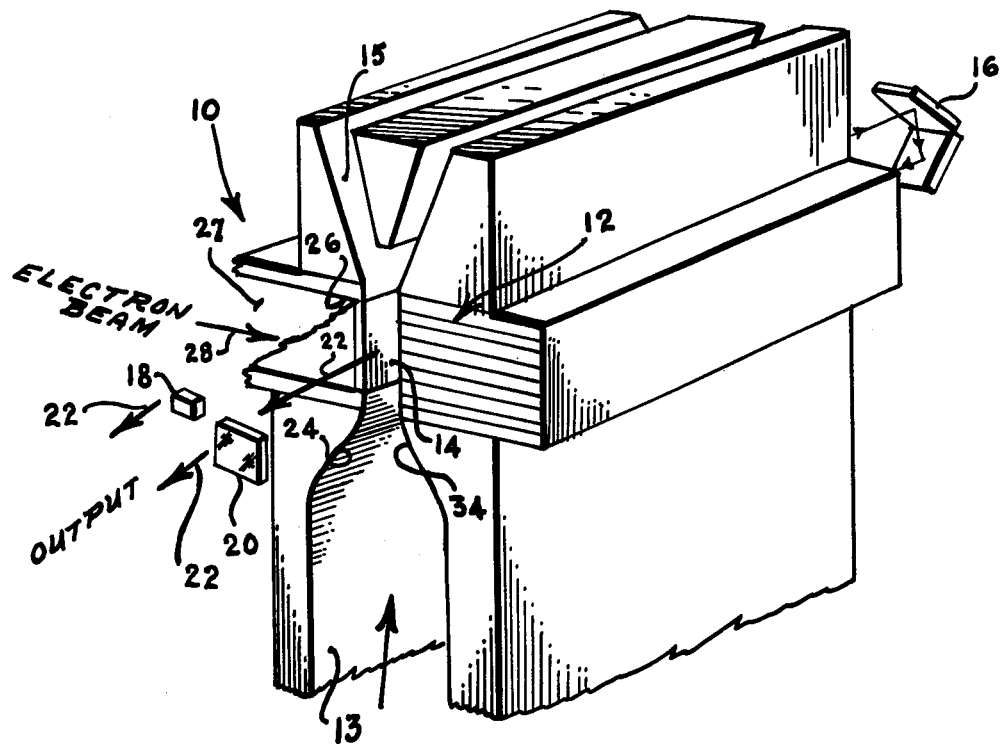
Figure 2:
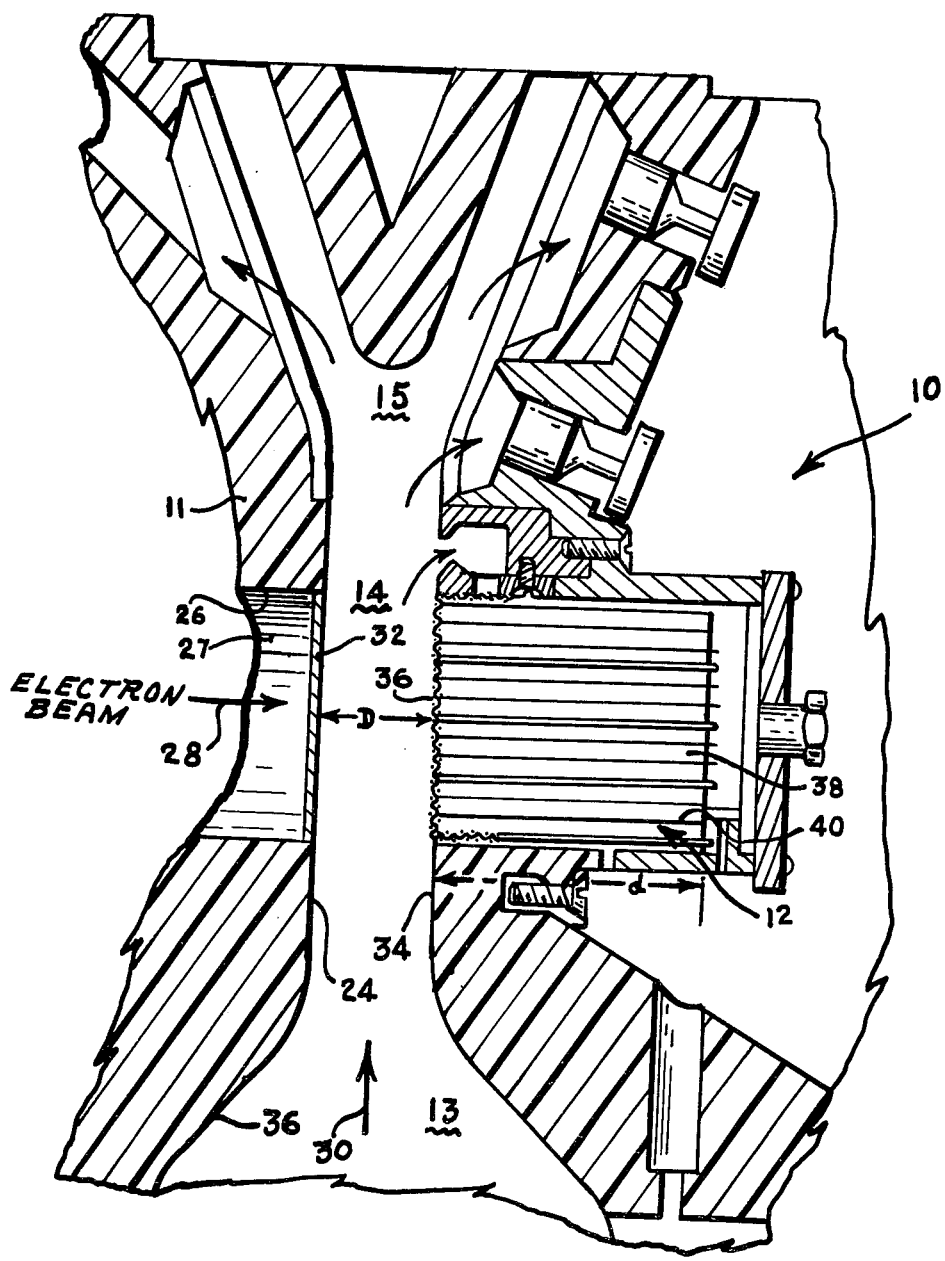

FIG. 1 is a pictorial representation of the high pressure, high power continuous wave electro-dynamic laser of this invention which incorporates therein the acoustic absorbing electrode; and FIG. 2 is a side view of the high pressure, high power, continuous wave electro-dynamic laser of this invention incorporating therein the acoustic absorbing electrode, and shown partly in cross section.

DETAILED DESCRIPTION OF THE PREFERRED EMBODIMENT

Reference is now made to FIGS. 1 and 2 of the drawing which show in detail the high pressure, high power continous wave electro-dynamic laser 10 of this invention having incorporated therein an acoustic absorbing electrode 12. Laser 10 is made of a body 11 made of any suitable electrically nonconductive material such as Lucite, Melamine, Fiberglass or Epoxy. Formed within body 11 is a passageway 13 of the converging nozzle-type configuration to allow for the input of a gaseous laser medium 30 from any suitable source (not shown).

Passageway 13 is operably connected to an optical or resonant cavity 14 which in turn is operably connected to the laser medium exit passageway 15. The resonant cavity 14 is defined by a generally rectangular configurated region of laser 10 bounded at the ends thereof by any suitable reflecting means and having its longitudinal axis transverse to the flow of the gaseous laser medium 30 (as clearly illustrated in FIG. 1 of the drawing). The reflecting means in the present invention take the form of, although not limited to, a corner reflector 16 at one end of resonant cavity 14 and feedback and primary mirrors 18 and 20 at the other end thereof, through which the output 22 of laser 10 emanates. Situated in one wall 24 of resonant cavity 14 of laser 10 is an opening 26 of an electron beam vacuum chamber 27 which allows for the introduction of a wide area electron beam 28 produced by a wide area electron gun (not shown) Electron beam 28 therefore enters cavity 14 in a direction transverse to the direction of flow of the gaseous laser medium 30 and the longitudinal axis of resonant cavity 14.

Separated the electron beam vacuum chamber 27 from the resonant cavity 14 is an electrode which in the continuous wave laser is preferably anode 32. Anode 32 may take the form of any suitable conductive foil material. Located juxtaposed and directly opposite anode 32 and in alignment with electron beam 28 on the opposite wall 34 of laser 10 is the acoustic absorbing wall, which in the case is in the form of cathode 12, of this invention. Cathode 12 forms part of wall 34 of optical or resonant cavity 14 and is coincidental with the active medium 30 within resonant cavity 14.

The active medium 30 within resonant cavity 14 is in the form of a gas capable of producing lasing action such as, a mixture comprising 16% $CO_2$, 34% $N_2$ and 50% He which may be supplied from any suitable conventional source (not shown) via gas inlet passageway 13. Laser operation takes place when electron beam 28 produces free electrons and ionizes the gaseous laser medium 30 in the presence of the sustainer electric field. For example, for high power laser operation an electron beam 28 provided with a voltage of 150 KV is utilized to achieve useful ionization of lasing medium 30.

In instances, where electro-dynamic laser 10 is of high power, high pressure and continuous wave, the acoustic and optical flux modes interact with each other with the growth of one causing a corresponding growth of the other. Such an action is commonly referred to as mode-medium interaction instability. In other words, the electromagnetic flux in cavity 14 under the circumstances set forth above is sensitive to small perturbations of the density profile of the lasing medium 30 in cavity 14, this density profile exists because of the standing acoustic wave, and the density profile in turn is affected by variations in the flux. In this type of feedback process a perturbation of the flux causes a change in the density profile of the lasing medium 30 which in turn increases the magnitude of the perturbations of the laser flux which then magnifies the change in the density profile. Continuation of this action takes place until the growth of one or both of these effects causes the lasing action to cease.

With the utilization of the acoustic absorbing cathode 12 of this invention such output laser flux modulations are controlled and substantially reduced by preventing the growth of the change in the density profile by damping out the acoustic waves. Acoustic absorbing cathode 12 is made of any electrically conductive surface material 36 having a backing material 38 capable of absorbing acoustic disturbances which arise from a linear instability within the resonant cavity 14. For example, surface 36 may be an 80-mesh screen backed by segmented volumes of 80 ppi Scott foam separated by sheets 40 of aluminum or a sintered fiber metal plate made out of stainless steel having an acoustic impendance of 30 to 50 Rayls.

The requisite properties of cathode 12 are that it be electrically conductive with sufficient surface area to operate in the normal cathode fall regime and be acoustically transmitting. The bulk of the acoustic absorbtion is accomplished in backing material 38. There are generally three requirements for the properties of backing material 38. First, the material should be a broad band absorber with its absorption peak centered around the fundamental anode to cathode acoustic frequency. Second, backing material 38 must be segmented to prevent recirculation within the absorber of the main stream laser cavity flow. Constant area heating of a subsonic flow causes the pressure to drop in the flow direction. For types of power loading used in the high pressure, high power, continuous wave electro-dynamic laser 10 of this invention the recirculation would be significant and therefore by segmenting absorber 12 the recirculation zones are greatly reduced in size. Third, the depth, d, of each absorption cell should be 2 to 3 times the anode to cathode spacing, D. With such an arrangement as described in detailed hereinabove, the present invention is capable of effectively controlling and reducing output flux modulation and therefore substantially increasing the output beam quality of laser beam 22.

Although this invention has been described with reference to a particular embodiment, it will be understood to those skilled in the art that this invention is also capable of other embodiments within the spirit and scope of the appended claims.

We claim:

1. In a high pressure, high power, continuous wave electro-dynamic laser having a resonant cavity with a longitudinal axis and a pair of side walls, a gaseous laser medium flowing through said resonant cavity in a direction substantially transverse to said longitudinal axis of said resonant cavity and between said side walls, a pair of oppositely disposed sustainer electrodes in the form of an anode and a cathode positioned to contact said gaseous laser medium, said anode and cathode having a fundamental anode to cathode frequency, an electron beam entering said resonant cavity through one of said side walls substantially transverse to both said longitudinal axis of said resonant cavity and the direction of said flow of said gaseous laser medium for pumping said gaseous laser medium, and means for extracting energy from said laser, the improvement being in the form of the other of said side walls, said other of said side walls comprising means being coincidental with said gaseous laser medium in said resonant cavity for absorbing acoustic disturbances which arise from a linear instability which occurs within said resonant cavity, said acoustic disturbance absorbent means having a surface of material porous to said gaseous laser medium and a backing material juxtaposed said surface material capable of broad band acoustic absorption, said backing material having an absorbtion peak centered around said fundamental anode to cathode frequency whereby output flux modulations within said resonant cavity are substantially reduced.

2. In a high pressure, high power, continuous wave electro-dynamic laser as defined in claim 1 wherein one of said electrodes forms at least part of one of said side walls of said resonant cavity while said other of said electrodes forms at least part of said other of said side walls of said resonant cavity.

3. In a high pressure, high power, continuous wave electro-dynamic laser as defined in claim 2 wherein said other electrode has sufficient area to operate in a normal cathode fall regime while also being capable of acoustic transmission.

4. In a high pressure, high power, continuous wave electro-dynamic laser as defined in claim 3 wherein said backing material is segmented.

5. In a high pressure, high power, continuous wave electro-dynamic laser as defined in claim 4 wherein said electrodes are spaced a preselected distance apart from one another and said backing material has a depth approximately 2 to 3 times said preselected distance between said electrodes.

6. In a high pressure, high power, continuous wave electro-dynamic laser as defined in claim 5 wherein said other electrode acts as said cathode.

7. In a high pressure, high power, continuous wave electro-dynamic laser as defined in claim 6 wherein said surface material of said acoustic disturbance absorbing means is made of a mesh material.

8. In a high pressure, high power, continuous wave electro-dynamic laser as defined in claim 7 wherein said backing material is in the form of an acoustic absorbing foam.

9. In a high pressure, high power, continuous wave electro-dynamic laser as defined in claim 1 wherein said electrodes are spaced a preselected distance apart from one another and said backing material has a depth approximately 2 to 3 times said preselected distance between said electrodes.

10. In a high pressure, high power, continuous wave electro-dynamic laser as defined in claim 1 wherein said backing material is segmented.

* * * * *